Feb. 25, 1969  E. R. COFFEY  3,429,134

CONDUIT IMPLANT ATTACHMENT

Filed June 8, 1967

INVENTOR.
EUGENE R. COFFEY

BY

ATTORNEY

United States Patent Office

3,429,134
Patented Feb. 25, 1969

1

3,429,134
CONDUIT IMPLANT ATTACHMENT
Eugene R. Coffey, 107 Duncan St.,
Montrose, Colo. 81401
Continuation-in-part of application Ser. No. 446,815,
Apr. 9, 1965. This application June 8, 1967, Ser.
No. 644,528
U.S. Cl. 61—72.6                5 Claims
Int. Cl. F16l 1/00; E02f 3/62

ABSTRACT OF THE DISCLOSURE

A tractor-towed mole type device incorporating an improved hitch for more efficiently injecting flexible conduit beneath ground surfaces of irregular contour and further incorporating elements providing improved conduit bedding in disturbed earth structures and means for selectively raising a loop of conduit above the earth surface for service access purposes.

Cross-reference to related application

The present application is a continuation-in-part of application Ser. No. 446,815 filed Apr. 9, 1965, by the same inventor now Patent No. 3,344,615.

Background of the invention

Others have previously designed mole units for placing flexible conduit beneath earth surfaces as the mole is moved forward behind a ripper element. Apparatus of the type set forth in the mentioned copending application has been successfully used for the placement of telephone cables, plastic pipe for water and gas services, and even steel lines. In some uses special requirements have been noted. When the units are used in rocky or shale type grounds, the plastic pipe can be abraided or broken by the earth materials as they come back into contact with the pipe. A bedding attachment is provided by the present invention to introduce fine materials about the pipe to prevent such damage. In the placement of flexible cables it has been noted that it is necessary to have frequent above ground access to the cables so house service lines may be installed. An attachment for pulling a loop in the cable that will extend above the ground is provided. The invention further provides a loaded guided roller for holding a conduit at the bottom of the mole unit and further improvements in the mole hitch components.

Summary of the invention

Briefly stated, the present invention provides improvements for the general type of attachment shown in the mentioned earlier application. One specific improvement is directed to an improved guide box which is attached to the ripper to guide the upper end of the mole attachment. The improvement utilizes telescoping tubes that are urged by a spring to a restricted position. Additionally, the present disclosure presents a conduit bedding attachment which can be used to introduce suitable bedding material about the conduit as it is being placed in the disturbed path behind the ripper tooth. A resiliently supported roller is also provided to more efficiently hold the conduit at the bottom of such ripped pathway. A looped pulling attachment is also provided which can be used in mechanisms of the foregoing type to selectively raise a section of conduit away from its bedded position when it is necessary or desirable to have above ground access to the conduit.

Specific objects of the invention would include the following:

To provide a conduit implant attachment that may be used to place flexible conduit beneath earth surfaces by ripping a path and emplacing the conduit in position at the bottom of such ripped path.

A further object is to provide an attachment for equipment of the foregoing type that will provide an improved conduit bedding surface when the implant equipment is being operated through rocky earth structures.

A further object of the invention is to provide a conduit implant attachment incorporating elements for holding the conduit at the bottom of the ripped path.

A relative objective is to provide a mechanism which will selectively elevate a section of conduit away from its bottom emplacement to provide a loop in said conduit for above ground access to said conduit.

Description of the preferred embodiments

Figure 1:
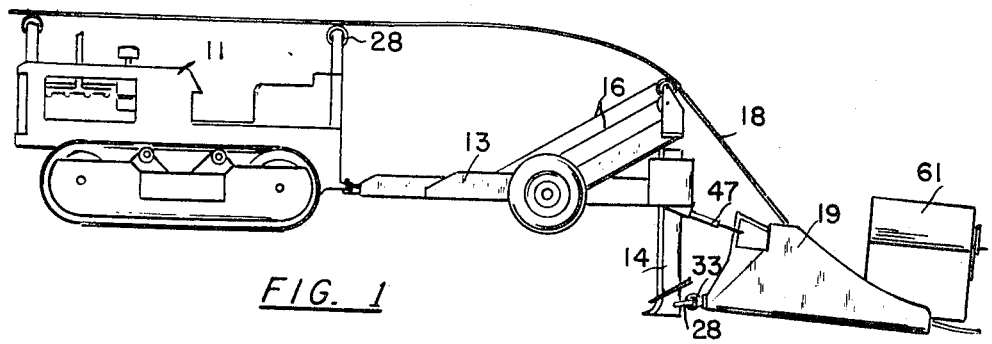
FIG. 1 is a side elevation in partial section illustrating improved features of the present embodiment of this invention.
Figure 2:
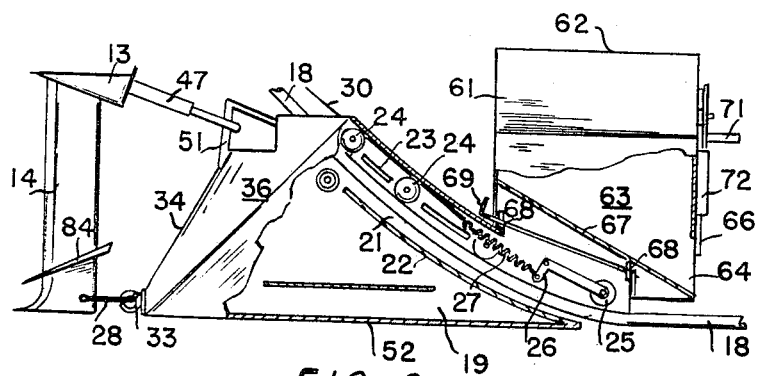
FIG. 2 is an enlarged elevation in partial cross-section presenting additional details of construction for the embodiment shown in FIG. 1.
Figure 3:
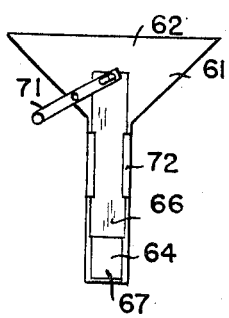
FIG. 3 is an end elevation showing details of the bedding attachment illustrated in FIGS. 1 and 2.

Specific features of the described improvements will be fully understood after reference to the appended drawings. In FIGS. 1, 2 and 3 the general overall features of a bedding attachment are illustrated. The bedding attachment 61 is mounted on the mole 19 in position adjacent the outlet opening thereof. When disposed in this position, loose materials can be introduced into the upper open ended hopper 62 which is in direct communication with a chamber 63 having parallel side walls of width substantially equal to the width of the main body of the mole attachment 19 itself. These parallel side walls, of course, trail behind the mole 19 in the pathway ripped by the ripper tooth 14 and held open by the side walls of the mole 19. The bedding attachment 61 is provided with a rear discharge opening 64 which may be opened or closed off by movement of a slide gate 66. When the gate is opened as shown in FIG. 3, the loose materials received in the hopper 62 will pass down through the chamber 63 above the false bottom 67 and be discharged out of the opening 64. Since this discharge position is directly above the emplaced conduit 18, the materials will tend to fall about the conduit 18. Loose materials or materials of fine granular size are usually introduced into the hopper 62, since materials of this type can provide good protection for the conduit 18.

An attachment of this type is intended for use when the mole implant apparatus is to be used to place conduit in earth structures where large or sharp rock may be encountered. The unit has actually been used to place conduit through bedded limestone deposits. When operations are being carried on under such difficult conditions, the introduction of sand or loose dirt materials through the bedding attachment can serve to surround and protect the conduit from abrasion or destruction due to impingement of falling rocks. The bedding materials further prevent later damage to the conduit due to soil stress movements of the broken rock components that might otherwise be directed against the walls of the conduit.

The bedding attachment 61 can be readily installed on the mole 19, since support brackets 68 can be permanently affixed to the mole 19. Mating elements of the bedding attachment 61 can be engaged with these support elements 68, and a lock pin 69 may be used to hold the structures in their engaged relationship. The amount of materials discharged by the bedding attachment or the rate of discharge thereof can be controlled by selective positioning of the control gate 66. A handle 71 is provided for raising and lowering the gate 66 which moves reciprocally in guide elements 72 attached to the side walls of the chamber 63.

A further improved feature of the present embodiment of the invention is shown in FIG. 2. Such improvement is related to the construction of the mole element 19 itself. Whereas the previous patent application showed a guide tube for receiving the conduit 18, it is now found to be desirable to provide a guide chamber 21 through which the conduit will be introduced to its bedded position. The guide chamber is defined by the side walls of the mole 19, a bottom wall 22 and an interrupted top wall 23. A plurality of guide rollers 24 extend past the confines of the top wall 23 for direct engagement with the conduit 18. A bottom roller 25 is mounted on a crank arm assembly 26 for pivoted movement restrained by a spring 27. The opposite end of the spring 27 is connected to a cable 30 which can be controlled by the operator to increase or decrease the spring tension as necessary to assure sufficient pressure against the conduit to hold the conduit at the bottom of the pathway ripped by the mole 19. This overall arrangement for the guided introduction of the conduit 18 is believed to present an improvement over the previous guide tube, inasmuch as abrasion of the conduit is minimized.

In connection with the use of the present guide chamber 21, it should be noted that the bottom 52 of the mole 19 is terminated at a position disposed forwardly of the moving roller 25. With this arrangement greater freedom of movement is provided for the conduit 18 as it emerges from the guide chamber 21. With greater freedom of movement less breakage of the conduit 18 is encountered due to abrupt changes in the positioning of the rear end of the mole 19 when buried rocks or obstructions are encountered by the ripper tooth 14. In use, the moving roller 25 will normally keep the conduit at the bottom of the path defined by the movement of the mole 19.

Figure 6:
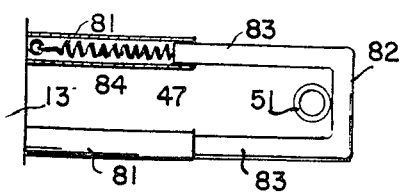
FIG. 6 is a plan view in partial section showing construction details for an improved guide box.

Another feature of the present invention which also tends to minimize damage to the conduit being placed is directed to the top guide for the mole 19. The inventor now prefers to provide a guide box 47 which uses telescoping tube members to restrain the guide bar 51 of the mole 19. The overall features of this improvement are best shown in FIG. 6 where the support tubes 81 extend outwardly behind the ripper 13. A U shaped structure 82 having slide tubes 83 is disposed for reciprocal movement within the support tubes 81. Outwardly directed movement of slide tubes 83 is restrained by tension springs 84 disposed within the reciprocating tubes 81-83. With this arrangement the guide bar 51 has a greater freedom of movement in the fore, aft and sideways directions than that previously shown in the mentioned earlier application. This greater freedom of movement prevents abrupt movements of the rear end of the mole and prevents unwanted breakage of the conduit being emplaced. As in the previous embodiment, the main towing force is exerted only against the lower hitch 28-33. This single point attachment allows the mole 19 to follow irregular contours and bends.

In use of the device disengagement of the reciprocating tubes 81-83 is usually prevented by use of a chain which extends from the ripper 13 and about the guide bar 51. Normally the length of this chain is adjusted to prevent disengagement of the reciprocating tubes 81-83, but the length of the chain can be substantially shortened when it is desired to positively restrain the upper end guide bar 51 when the mole 19 is to be elevated out of the ground or when the mole is to be carried from one work site to another.

With this arrangement, as in the previous embodiment of the invention, the main movement patterns for the mole are governed by the movement of the lower attachment provided by a pintle hook and lunette 33 and 28, respectively. The main towing force exerted on the mole is transmitted by such attachment, and the upper end of the mole is merely guided by the cooperative engagement between the guide bar 51 and the guide box 47. It should be noted, as illustrated in FIG. 1, that the lunette 28 can itself be pivoted. Accordingly, the forward end of the mole 19 can attain depressed or elevated positions with respect to the ripper tooth 14, as illustrated in FIG. 1. This freedom of vertical movement at the front of the mole is important when the attachment is being used in ground structures where boulders or other major obstructions might be encountered. A sharp upward movement of the ripper tooth due to engagement with such an obstruction does not result in a corresponding abrupt movement of the mole itself.

Improved operations have been noted when the ripper tooth 14 is provided with outwardly extending flanges or paravanes 84 that are disposed at a downwardly directed angle. These vanes help to rip a pathway that will be as wide as the mole 19, and they also tend to hold the ripper tooth 14 at its full penetration depth. As in the previous embodiment, the rearwardly inclined tapered lead edge 34 and the rearwardly tapered surfaces 36 of the mole 19 tend to hold the mole itself at the bottom of the ripped pathway.

Figure 4:
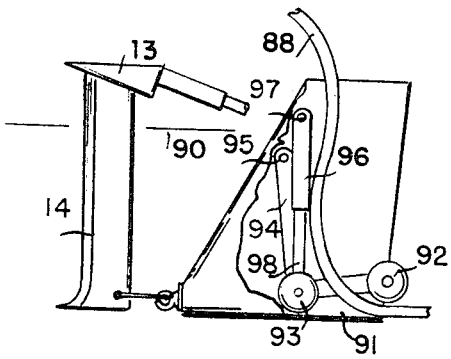
FIG. 4 is a side elevation with partial broken section showing features of a loop pulling attachment.
Figure 5:
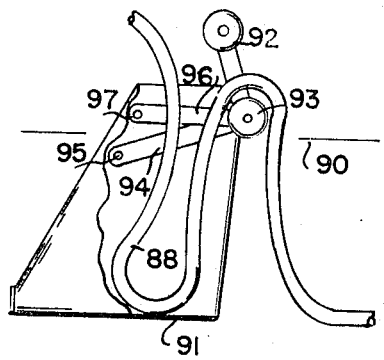
FIG. 5 is a side elevation with partial broken section showing an alternate position for the mechanism presented in FIG. 4.

In connection with some conduit burying operations it has been found desirable to periodically provide access to the conduit. In connection with the emplacement of buried telephone and power service cables especially, it becomes desirable to have the cable raised above the ground for service access. In subdivisions where underground cables are provided for household utilities, access to the cables may be necessary at 50 to 75 foot intervals. A mole attachment that can conveniently provide such service loops is illustrated in FIGS. 4 and 5. Here the mole 91 can be of shorter length due to the more flexible nature of the conduit being employed. The cable or conduit 18 is introduced into the top of the mole and is disposed between a pair of guide rollers 92 and 93 that are mounted on an L-shaped arm 94. The arm 94 is pivoted at 95 so that the rollers 92 and 93 may be moved to alternate positions as illustrated. In the lowered position the roller 92 tends to hold the cable 88 at the bottom of the pathway ripped by the ripper tooth 14. The elevating roller 93 will raise the cable 88 to an elevation above the ground line 90. The elevated cable can then be grasped by an attendant, and the arm 94 may again be lowered to depress the cable to the bottom of the mole 91. Subsequent forward movement of the mole will then leave a loop in the cable with the top of the loop being disposed above the ground line 90 for the convenient interconnection of household service lines and for placement in a ground type service entrance box. The desired movements of the L arm can be energized through use of a hydraulic cylinder 96 that is itself pivotally mounted at 97 within the mole 91. The shaft end 98 of the hydraulic cylinder 96 is, of course, attached to the L arm so that the rollers 92 and 93 may be forcibly raised or lowered for accomplishment of the desired multiple purposes.

While separate embodiments of the invention have been shown and described, it should be apparent that the present developments are adaptable to various modifications and changes. All modifications, changes or additions coming within the scope of the appended claims are considered to be a part of this invention.

I claim:

1. A mechanism for placing conduit beneath earth surfaces as the mechanism is towed behind tractor type equipment utilizing a frame, a ripper tooth on said frame to which the towing forces of said equipment are transmitted and apparatus for adjusting the earth penetrating depth of the tooth comprising a separately movable mole implant unit for use behind said ripper tooth of height corresponding to the operative height of said tooth whereby a top portion of such mole unit is adjacent or above the earth surface for all selected penetration depths of said ripper tooth and mole, sides on said mole unit for progressively excluding disturbed earth components from the path cut by said ripper tooth whereby the conduit may be introduced downwardly to the bottom of said mole unit for exit therefrom at the lower rear end of said mole, and a bedding materials attachment for use on said mole unit comprising a hopper disposed above the earth surface for all penetration depths of said ripper tooth and mole and adapted to receive bedding materials, side panels on said attachment to provide a material flow passage for delivering the bedding materials from said hopper downwardly to surround said conduit before the excluded earth components are released by forward movement of said mole, a control element on said bedding materials attachment for regulating the quantity of bedding materials released, and operator means disposed on said attachment at an elevation that will be above ground for operative penetration depths of said mechanism for adjusting the delivery of said bedding materials.

2. Structure as set forth in claim 1 and further comprising a rearwardly inclined leading edge of said mole unit, means at the lower extremity of said ripper tooth for pivotally and selectively connecting said mole unit to said ripper tooth for rotation with respect to horizontal and vertical axes of reference whereby the forces tending to move said tooth through the earth will be transmitted to the bottom of said mole unit, and a telescoping guide piece adjacent the upper end of said ripper tooth and extending rearwardly therefrom for engagement with said mole unit to hold said mole unit in near vertical orientation while permitting fore and aft movement of the upper end of said mole unit as the unit moves rotationally with respect to the lower horizontal axis of reference, said guide piece further permitting free swinging movements of the rear end of said mole unit as the unit rotates about the resultant movable vertical axis.

3. A mechanism for placing conduit beneath earth surfaces as the mechanism is towed behind tractor type equipment utilizing a frame, a ripper tooth on said frame to which the towing forces of said equipment are transmitted and apparatus for adjusting the earth penetrating depth of the tooth comprising a separately movable mole implant unit for use behind said ripper tooth of height corresponding to the operative height of said tooth whereby a top portion of such mole unit is adjacent or above the earth surface for all selected penetration depths of said ripper tooth and mole, sides on said mole unit for progressively excluding disturbed earth components from the path cut by said ripper tooth whereby the conduit may be introduced downwardly to the bottom of said mole unit for exit therefrom at the lower rear end of said mole, said sides providing an open space in said mole unit, pivotally mounting guide rollers in said open space for contacting engagement with said conduit, and means for moving said rollers from a lower position tending to hold said conduit at the bottom of said mole to an elevated position for raising a loop of said conduit upwardly through said open space to the earth surface for conduit access purposes.

4. Structure as set forth in claim 3 wherein at least two guide rollers are mounted on a pivotal arm and wherein said means comprises a hydraulic cylinder engaging said arm for elevating and depressing said rollers.

5. Structure as set forth in claim 3 and further comprising a rearwardly inclined leading edge on said mole unit, means at the lower extremity of said ripper tooth for pivotally and selectively connecting said mole unit to said ripper tooth for rotation with respect to horizontal and vertical axes of reference whereby the forces tending to move said tooth through the earth will be transmitted to the bottom of said mole unit, and a telescoping guide piece adjacent the upper end of said ripper tooth and extending rearwardly therefrom for engagement with said mole unit to hold said mole unit in near vertical orientation while permitting fore and aft movement of the upper end of said mole unit as the unit moves rotationally with respect to the lower horizontal axis of reference, said guide piece being cooperatively positioned with respect to said lower connecting means to establish a rearwardly inclined and movable axis for swinging movements of said mole unit with respect to said vertical axis of reference when said mole unit is in position of use.

References Cited

UNITED STATES PATENTS

| 166,104 | 7/1875 | Hoffhein | 61—72.6 X |
| 3,083,542 | 4/1963 | Summers et al. | 61—72.1 |
| 3,170,300 | 2/1965 | Kelley | 61—72.6 |
| 3,307,363 | 3/1967 | Kinnan | 61—72.6 |

FOREIGN PATENTS

| 1,201,441 | 9/1965 | Germany. |

EARL J. WITMER, *Primary Examiner.*

U.S. Cl. X.R.

61—72.1